United States Patent
Yoshida et al.

(10) Patent No.: US 12,199,844 B2
(45) Date of Patent: Jan. 14, 2025

(54) BURST TRAFFIC DETECTION DEVICE AND METHOD

(71) Applicant: Nippon Telegraph and Telephone Corporation, Tokyo (JP)

(72) Inventors: Shuhei Yoshida, Tokyo (JP); Yuta Ukon, Tokyo (JP); Shoko Oteru, Tokyo (JP); Namiko Ikeda, Tokyo (JP); Koyo Nitta, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 398 days.

(21) Appl. No.: 17/628,954

(22) PCT Filed: Jul. 23, 2019

(86) PCT No.: PCT/JP2019/028797
§ 371 (c)(1),
(2) Date: Jan. 21, 2022

(87) PCT Pub. No.: WO2021/014552
PCT Pub. Date: Jan. 28, 2021

(65) Prior Publication Data
US 2022/0263733 A1    Aug. 18, 2022

(51) Int. Cl.
*H04L 43/026* (2022.01)
*H04L 43/04* (2022.01)
(Continued)

(52) U.S. Cl.
CPC ............ *H04L 43/026* (2013.01); *H04L 43/04* (2013.01); *H04L 43/16* (2013.01); *H04L 43/18* (2013.01); *H04L 69/22* (2013.01)

(58) Field of Classification Search
CPC ....... H04L 43/026; H04L 43/04; H04L 43/16; H04L 43/18; H04L 69/22; H04L 41/142;
(Continued)

(56) References Cited

U.S. PATENT DOCUMENTS

| 2014/0192646 A1* | 7/2014 | Mir ..................... H04L 47/2441 370/235 |
| 2018/0091426 A1* | 3/2018 | Bao ..................... H04L 43/0888 |
| 2020/0036645 A1* | 1/2020 | Nagao ................. H04L 43/0829 |

OTHER PUBLICATIONS

Anritsu Corp., "Data Quality Analyzer MD1230B", Product Brochure MD1230B, Mar. 24, 2016, https://dl.cdn-anritsu.com/ja-jp/test-measurement/files/Brochures-Datasheets-Catalogs/Brochure/md1230b-j11100.pdf, 16 pages.

* cited by examiner

*Primary Examiner* — Charles C Jiang
*Assistant Examiner* — Rachel Elizabeth Marks
(74) *Attorney, Agent, or Firm* — SLATER MATSIL, LLP

(57) ABSTRACT

A burst traffic detection device includes a packet receiver configured to receive packets from a network, a flow specification device configured to specify, in accordance with header information of the packets, flow rules, a flow information storage device configured to store flow information of the specified flow rules, a statistical information storage device configured to store statistical information including the total number of packets for each flow rule and/or the total number of bytes for each flow rule, a burst detection device configured to detect the occurrence of burst traffic in accordance with the statistical information, and a detection count storage device configured to store the number of times of the occurrence of burst traffic.

8 Claims, 6 Drawing Sheets

(51) Int. Cl.
*H04L 43/16* (2022.01)
*H04L 43/18* (2022.01)
*H04L 69/22* (2022.01)

(58) Field of Classification Search
CPC .. H04L 47/2441; H04L 47/2483; H04L 67/55
See application file for complete search history.

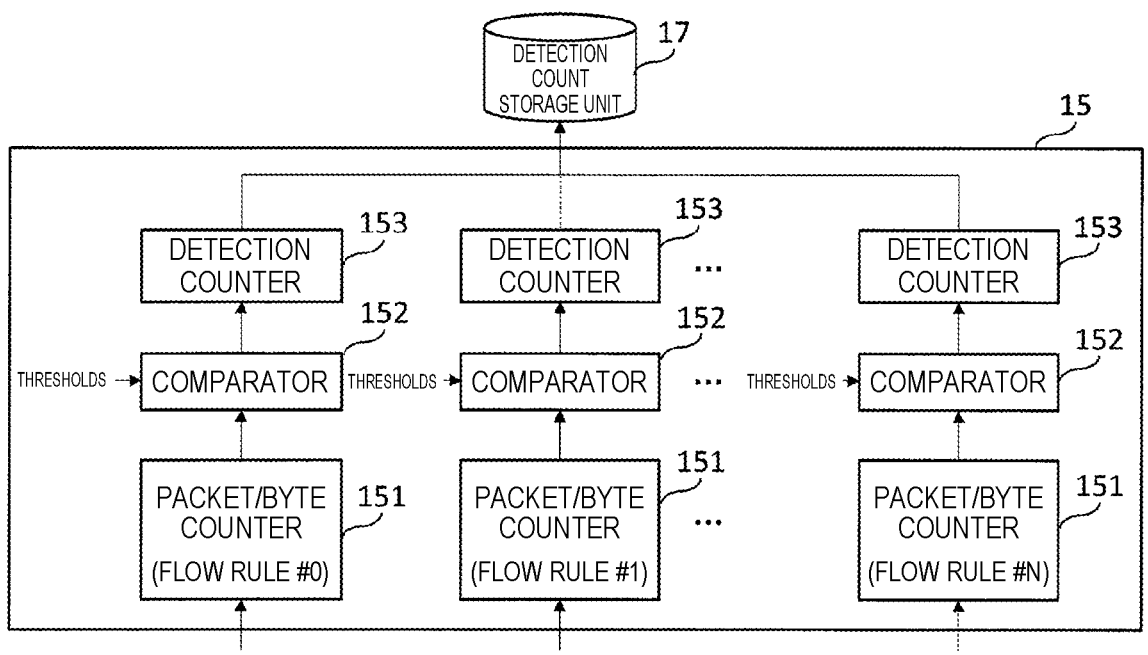

Fig. 5

| FLOW TYPE | PACKET COUNT | BYTE COUNT |
|---|---:|---:|
| ALL TRAFFIC FLOWS | 1,000 | 256,000 |
| FLOW RULE #0 | 100 | 12,800 |
| FLOW RULE #1 | 200 | 25,600 |
| ⋮ | ⋮ | |
| FLOW RULE #N | 400 | 51,200 |

Fig. 6

| PERIOD | FLOW TYPE | DETECTION COUNT |
|---|---|---:|
| 0 TO $T_2$ | ALL TRAFFIC FLOWS | 10 |
| | FLOW RULE #0 | 1 |
| | FLOW RULE #1 | 2 |
| | ⋮ | ⋮ |
| | FLOW RULE #N | 3 |
| $T_2$ TO $2T_2$ | ALL TRAFFIC FLOWS | 15 |
| | FLOW RULE #0 | 1 |
| | FLOW RULE #1 | 4 |
| | ⋮ | ⋮ |
| | FLOW RULE #N | 3 |

BURST TRAFFIC DETECTION DEVICE AND METHOD

CROSS-REFERENCE TO RELATED APPLICATIONS

This application is a national phase entry of PCT Application No. PCT/JP2019/028797, filed on Jul. 23, 2019, which application is hereby incorporated herein by reference.

TECHNICAL FIELD

The present invention relates to a technology for detecting burst traffic, which is one of causes of communication failures such as packet loss and network delay in IP networks.

BACKGROUND

In recent years, with the development of high-speed high-capacity network communications, communication failures due to sudden great increases in traffic (burst traffic) have come to be seen as a problem. When burst traffic occurs, a large number of packets arrive at a buffer of a switch device in a network path, and as a result, network delay or packet loss may be caused. Such communication failures degrade the quality of service. Hence, it is important to identify causes of burst traffic and promptly perform recovery operations from failures.

Various studies have been conducted to detect burst traffic. For example, one method is to collect statistical information such as the number of packets and the number of bytes whenever packets are inputted, subsequently determine, at fixed detection intervals, whether the statistical information exceeds a preset threshold with respect to individual flows, and consequently obtain information indicating a particular time and a particular flow at which a burst occurs. Non-Patent Literature 1 describes a commercially available network monitoring device capable of detection with temporal resolution up to 1 ms.

CITATION LIST

Non-Patent Literature

Non-Patent Literature 1: "Data Quality Analyzer MD1230B", Anritsu, Product Brochure, [searched on Jul. 23, 2019], Internet <URL: https://dl.cdn-anritsu.com/ja-jp/test-measurement/files/Brochures-Datasheets-Catalogs/Brochure/mdi230b-j11100.pdf.

SUMMARY

Technical Problem

The product in Non-Patent Literature 1 displays the representation of burst traffic of every detection interval (for example, every 1 ms) on a screen. Storing all information about detected burst traffic can provide detailed detection information. However, when microburst detection is carried out for several to tens of thousands of traffic flows in a data center, a considerable amount of data needs to be stored, which results in a need for enormous memory resources.

Embodiments of the present invention have been made to address the problem, and an object thereof is to provide a burst traffic detection device that can analyze burst traffic with respect to a plurality of flows by using memory resources less than memory resources used in known technologies.

Means for Solving the Problem

To address the problem described above, a burst traffic detection device according to embodiments of the present invention includes a packet reception unit configured to receive packets from a network, a flow specification unit configured to specify, in accordance with header information of the packets, flow rules, a flow information storage unit configured to store flow information of the specified flow rules, a statistical information storage unit configured to store statistical information including the total number of packets for each of the flow rules and/or the total number of bytes for each of the flow rules, a burst detection unit configured to detect the occurrence of burst traffic in accordance with the statistical information, and a detection count storage unit configured to store the number of times of the occurrence of burst traffic. The burst detection unit is configured to determine in a predetermined first cycle whether the total number of packets and/or the total number of bytes exceed preset thresholds. The detection count storage unit is configured to collect, as a burst detection count for each of the flow rules, the number of times the thresholds are exceeded. The statistical information storage unit is configured to delete, after the burst detection count for each of the flow rules is collected, the statistical information of the flow rule.

To address the problem described above, a traffic monitoring method according to embodiments of the present invention includes a packet reception step of receiving packets from a network, a flow specification step of specifying, in accordance with header information of the packets, flow rules, a flow information storage unit configured to store flow information of the specified flow rules, a statistical information storage step of storing statistical information including the total number of packets for each of the flow rules and/or the total number of bytes for each of the flow rules, a burst detection step of detecting the occurrence of burst traffic by determining in a predetermined first cycle whether the total number of packets for each of the flow rules and/or the total number of bytes for each of the flow rules exceed preset thresholds, a detection count storage step of collecting, as the burst detection count for each of the flow rules, the number of times the thresholds are exceeded, and a statistical information deletion step of, after the burst detection count of each of the flows rule is collected, deleting the statistical information of the flow rule.

Effects of Embodiments of the Invention

Embodiments of the present invention can analyze burst traffic with respect to a plurality of flows by using memory resources less than memory resources used in known technologies.

BRIEF DESCRIPTION OF THE DRAWINGS

FIG. 3 is a block diagram illustrating details of a burst detection unit.

FIG. 4 illustrates a table of flow information stored by a flow information storage unit.

FIG. 5 illustrates a table of statistical information stored by a statistical information storage unit.

FIG. 6 illustrates a table of detection information stored by a detection information storage unit.

DETAILED DESCRIPTION OF ILLUSTRATIVE EMBODIMENTS

Hereinafter, embodiments of the present invention will be described in detail with reference to the drawings. The present invention is not limited to the embodiments described below.

First Embodiment

Figure 1:
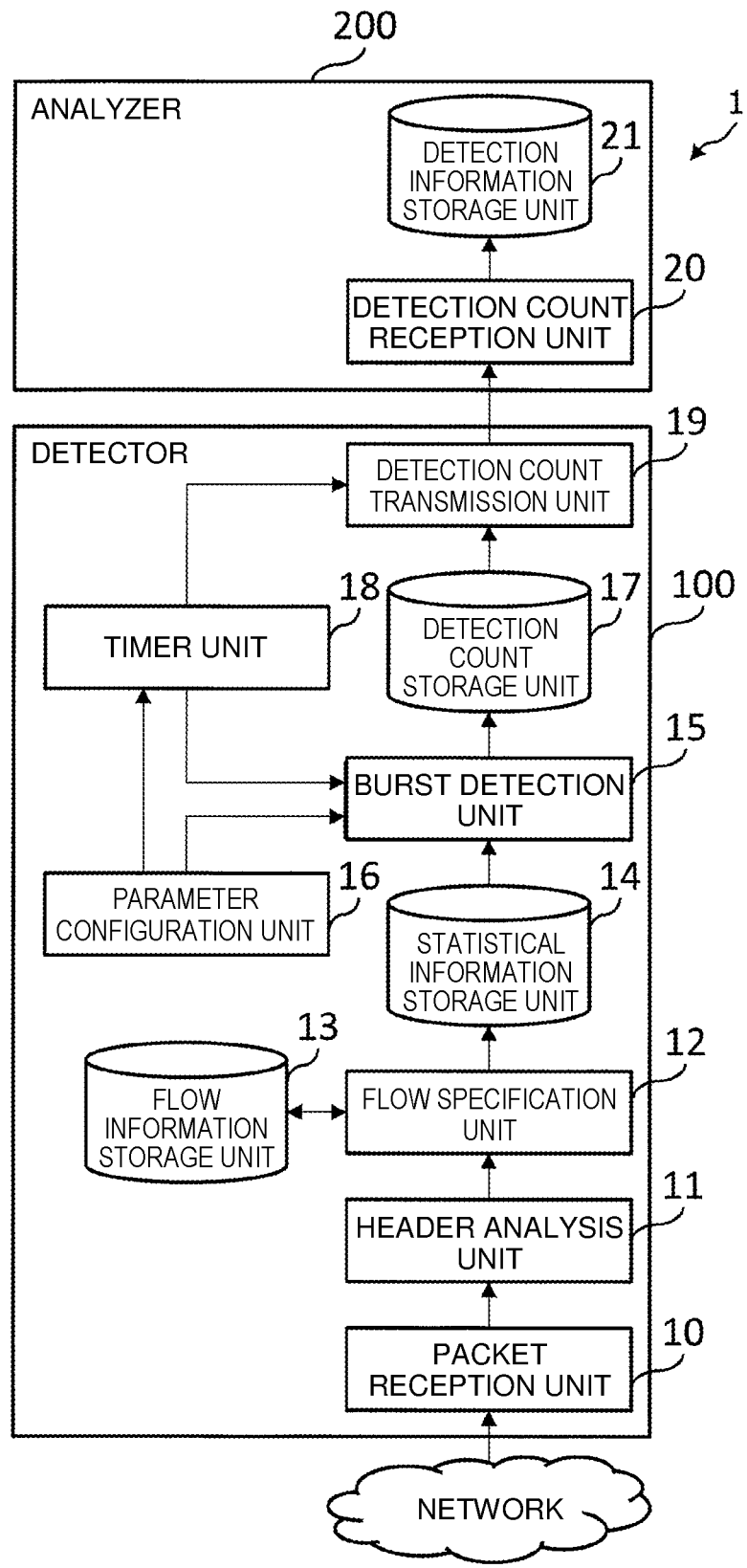
FIG. 1 is a block diagram illustrating a configuration of a burst traffic detection device according to a first embodiment of the present invention.

The following is a description of a first embodiment of the present invention. FIG. 1 is a block diagram illustrating a configuration of a burst traffic detection device of the first embodiment of the present invention.

Configuration of Burst Traffic Detection Device

A burst traffic detection device 1 of the first embodiment includes a detector 100 configured to detect the occurrence of burst traffic and store information of the number of occurrences of burst traffic. The burst traffic detection device 1 may also include an analyzer 200 configured to analyze burst traffic as necessary.

The detector 100 includes a reception unit 10, a header analysis unit 11, a flow specification unit 12, a flow information storage unit 13, a statistical information storage unit 14, a burst detection unit 15, and a detection count storage unit 17. The packet reception unit 10 receives a packet from a connected network. The header analysis unit 11 analyzes a header of the received packet. The flow specification unit 12 specifies a flow rule of a traffic flow corresponding to the packet in accordance with the analyzed header information. The flow information storage unit 13 stores flow information. The statistical information storage unit 14 stores statistical information including the total number of packets and the total number of bytes with respect to individual flow rules. The burst detection unit 15 determines in a predetermined cycle T1 (first cycle), whether the total number of packets and the total number of bytes stored by the statistical information storage unit 14 for each flow rule exceed preset thresholds. The detection count storage unit 17 collects the number of times the thresholds are exceeded, as a burst detection count of each flow rule.

The detector 100 may further include a detection count transmission unit 19 for transmitting to the analyzer 200 the burst detection count for each flow rule collected in the detection count storage unit 17. For example, the detection count transmission unit 19 may transmit a burst detection count for each flow rule in a predetermined cycle T2 (second cycle). The analyzer 200 for analyzing burst traffic includes a detection count reception unit 20 configured to receive the burst detection count from the detection count transmission unit 19 and a detection information storage unit 21 configured to store the received detection count.

The information of the predetermined cycles T1 and T2 and the thresholds used for burst detection may be preset in the burst detection unit 15 and the detection count transmission unit 19. Alternatively, a timer unit 18 for sending triggers to the burst detection unit 15 and the detection count transmission unit 19 in the predetermined cycles T1 and T2 and a parameter configuration unit 16 for setting various parameters (cycles T1 and T2 and thresholds used for burst detection) may be provided.

The function of the detector 100 and the function of the analyzer 200 may be implemented by software with the use of a central processing unit (CPU) or may be implemented by a hardware component such as a field-programmable gate array (FPGA) or application-specific integrated circuit (ASIC).

Operational Flow of Burst Traffic Detection Method

Figure 2:
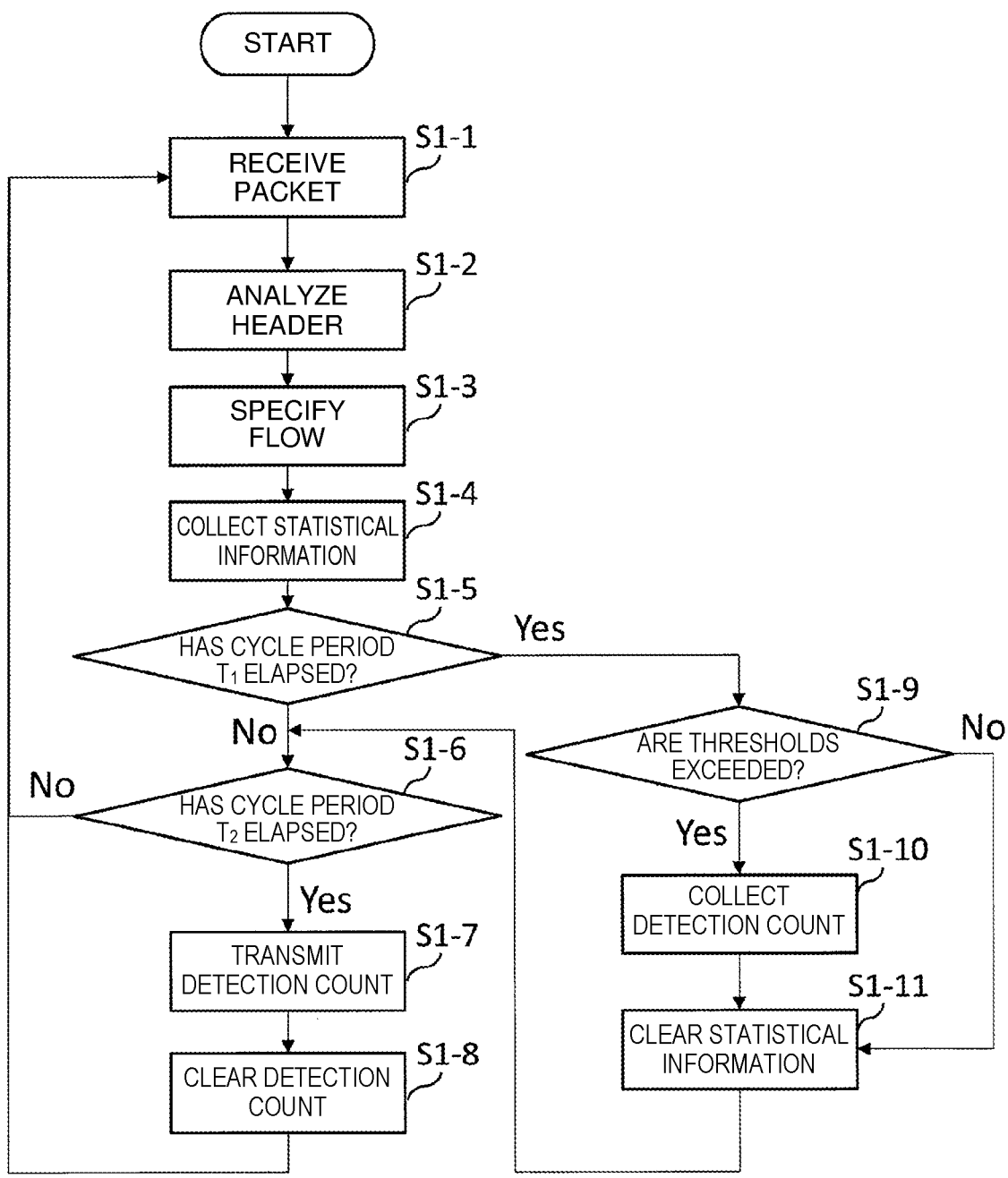
FIG. 2 is a flowchart illustrating an operational procedure of a burst traffic detection method according to the first embodiment of the present invention.

An operational procedure of a burst traffic detection method according to the first embodiment will be described with reference to FIG. 2. A flowchart in FIG. 2 is illustrated only to facilitate understanding of the operation of the burst traffic detection method and thus intended not to limit the control procedure and implementation method.

In the burst traffic detection method according to the present embodiment, firstly, the packet reception unit 10 receives a packet from a network connected to the burst traffic detection device (packet reception step S1-1).

Next, the header analysis unit 11 analyzes a header by extracting values in header fields of the received packet (header analysis step S1-2). The flow specification unit 12 determines, in accordance with the extracted values in the header fields, a flow rule that the received packet follows (flow specification step S1-3). Specifically, the flow specification unit 12 searches the flow information storage unit 13 for the flow rule to determine whether the flow rule has been registered in the flow information storage unit 13. When the flow rule has been registered, the flow specification unit 12 obtains a flow ID of the flow rule. When the flow rule has not been registered, the flow specification unit 12 newly registers the flow rule in the flow information storage unit 13 and obtain a new flow ID.

Next, the flow specification unit 12 sends to the statistical information storage unit 14 a notification of the flow ID and the number of bytes of the packet. The statistical information storage unit 14 searches for the flow ID indicated by the notification to determine whether the flow ID has been registered in stored statistical information. When the flow ID has been registered, the statistical information storage unit 14 increments the total number of packets of the flow ID by 1 and also increments the total number of bytes of the flow ID by the number of bytes indicated by the notification, such that the statistical information storage unit 14 stores statistical information including the total number of packets and the total number of bytes with respect to individual flow rules (statistical information storage step S1-4). When the flow ID indicated by the notification has not been registered in the statistical information, the statistical information storage unit 14 newly registers the flow ID, 1 as the total number of packets, and the number of bytes indicated by the notification as the total number of bytes.

As the statistical information, both or either of the total number of packets and the total number of bytes may be stored. The statistical information can be set in accordance with what is analyzed with regard to burst traffic.

The burst detection unit 15 detects the occurrence of burst traffic in accordance with the total number of packets and the total number of bytes. In the present embodiment, the occurrence of burst traffic is determined by determining, with respect to every predetermined cycle T1, whether the total number of packets and the total number of bytes of any flow rule exceed preset thresholds (burst detection step S1-9). When the total number of packets and the total number of bytes of a particular flow rule exceed the preset thresholds, the burst detection unit 15 determines the occurrence of burst traffic. Accordingly, a burst detection count of the particular flow rule stored by the detection count storage unit 17 is incremented by 1, such that the burst detection unit 15 collects a burst detection count for each flow rule (detection count storage step S1-10).

After the burst detection count is collected, the statistical information storage unit 14 clears to 0 the statistical information about the flow rule of the collected burst detection count out of the stored statistical information (S1-11). When the total number of packets and the total number of bytes of a particular flow rule do not exceed the preset thresholds, the statistical information storage unit 14 also clears the statistical information about the flow rule to 0 (statistical information deletion step S1-11).

As described above, statistical information is deleted after the occurrence of burst traffic is determined. Thus, the statistical information used to detect the occurrence of burst traffic is deleted, but only the burst detection count for each flow rule is collected. For this reason, the analysis of burst traffic with respect to a plurality of flows can be carried out by using relatively less memory resources.

In the flowchart in FIG. 2, the burst detection count for each flow rule collected by the detector 100 is transmitted to the analyzer 200 in the predetermined second cycle. It is determined whether the predetermined cycle T2 has elapsed (S1-6). When the predetermined cycle T2 has elapsed, the detection count transmission unit 19 transmits to the detection count reception unit 20 the burst detection count stored by the detection count storage unit 17 (detection count transmission step S1-7). After the burst detection count is transmitted, the burst detection count stored by the detection count storage unit 17 is cleared to 0 (detection count deletion step S1-8).

Because the burst detection count is cleared to 0 after the burst detection count collected in the predetermined cycle T2 is transmitted, the detection information storage unit 21 of the analyzer 200 stores only the burst detection count in the corresponding predetermined cycle T2. Storing only the burst detection count in the predetermined cycle T2 enables the analysis of burst traffic in accordance with a short cycle with the use of less memory resources.

The predetermined cycle T2 may be registered in the detection count transmission unit 19. Alternatively, a trigger may be transmitted by the timer unit 18 at every predetermined cycle T2 to cause the detection count transmission unit 19 to transmit a burst detection count. The predetermined cycle T2 can be identical to or longer than the cycle T1. The predetermined cycles T1 and T2 can be set as appropriate in accordance with the traffic condition targeted for analysis and specifics of data analysis.

FIG. 3 is a block diagram illustrating details of the burst detection unit. The burst detection unit 15 includes a byte counter and packet counter 151 configured to collect for each flow rule the total number of bytes of packets corresponding to the flow rule and the total number of the packets, a comparator 152 configured to determine whether the number of packets and the number of bytes collected in the predetermined cycle T1 exceed preset thresholds, and a detection counter 153 configured to count the number of times the number of packets and the number of bytes exceed the preset thresholds. The thresholds may vary with individual flow rules.

FIG. 4 illustrates a table of flow information stored by the flow information storage unit. In FIG. 4, source and destination MAC addresses and source and destination IP addresses are used as an example of header field information for specifying flow rules, but information for specifying flow rules is not limited to this example. Flow rules may be specified in accordance with header field information including source and destination port numbers, protocol type, VLAN ID, and VXLAN ID.

FIG. 5 illustrates a table of statistical information stored by the statistical information storage unit. The statistical information storage unit 14 can store the total number of packets and the total number of bytes of each flow rule and also the total number of packets and the total number of bytes of packets received through all traffic flows. As the statistical information, both or either of the total number of packets and the total number of bytes may be stored.

FIG. 6 illustrates a table of detection information stored by the detection information storage unit. The detection count storage unit 17 stores only a burst detection count of one period of the predetermined cycle T2, transmits the burst detection count to the analyzer 200 in the cycle T2, and then clears the burst detection count to 0. The detection information storage unit 21 of the analyzer 200 stores transmitted detection counts of a plurality of cycles of the cycle T2.

As described above, in the first embodiment, after the determination of the occurrence of burst traffic, the statistical information used to determine the occurrence of burst traffic is deleted. And as a result, only the number of occurrences of burst traffic for each flow rule is collected. Consequently, the analysis of burst traffic with respect to a plurality of flows can be carried out by using relatively less memory resources. Additionally, storing only the burst detection count in the predetermined cycle enables the analysis of burst traffic in accordance with a short cycle with the use of less memory resources. The present embodiment can obtain analysis data sufficient for primary division for identifying a flow causing burst traffic while using reduced memory resources.

Second Embodiment

Figure 7:
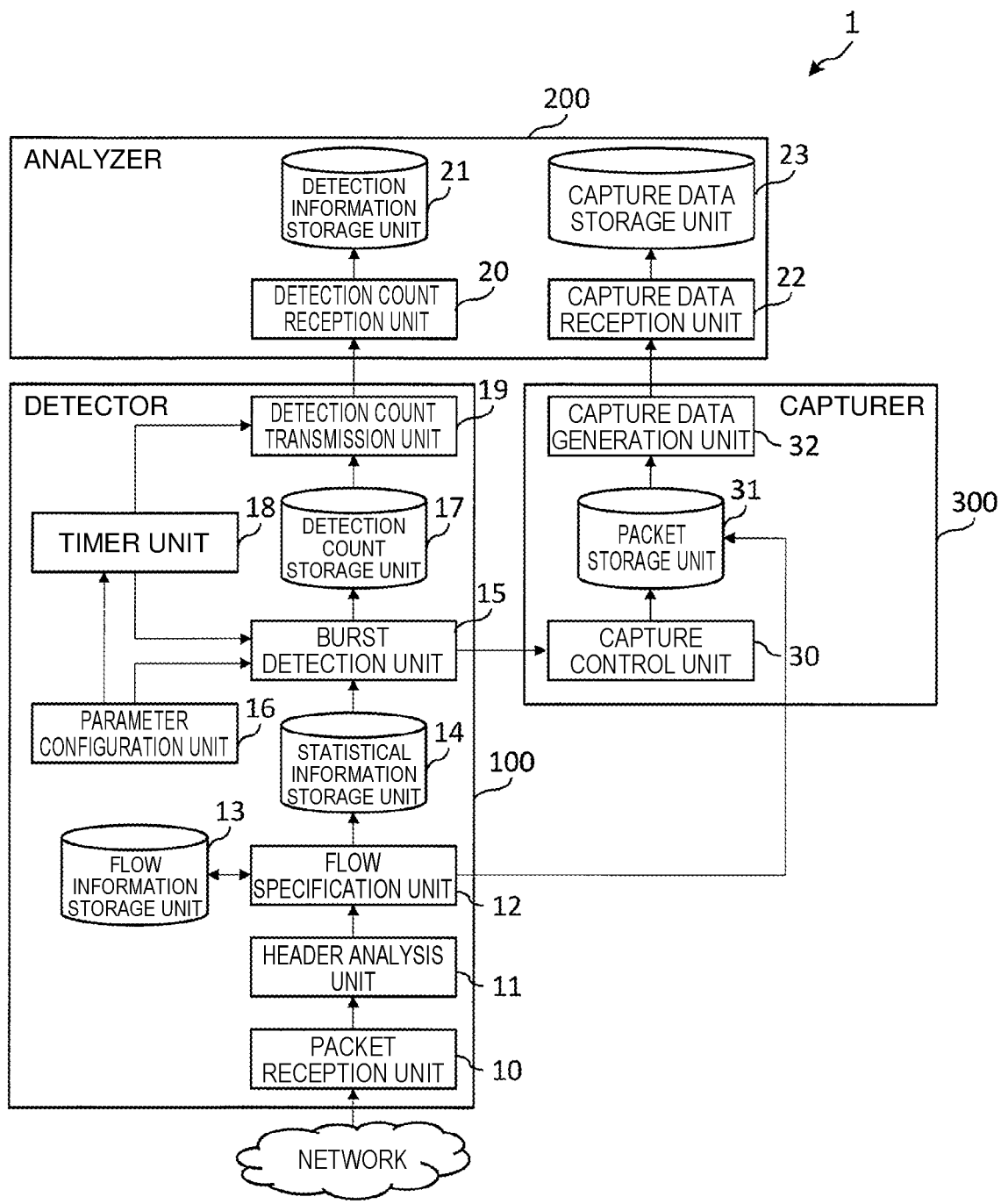
FIG. 7 is a block diagram illustrating a configuration of a burst traffic detection device according to a second embodiment of the present invention.

The following is a description of a second embodiment of the present invention. FIG. 7 is a block diagram illustrating a configuration of a burst traffic detection device according to the second embodiment of the present invention.
Configuration of Burst Traffic Detection Device The burst traffic detection device 1 according to the second embodiment includes a capturer 300 in addition to the detector 100 of the first embodiment. The function of the capturer 300 may be implemented by software with the use of a CPU or may be implemented by a hardware component such as an FPGA or ASIC, in the same manner as the detector 100 and the analyzer 200.

The capturer 300 includes a capture control unit 30 configured to control capture operation for received packets, a packet storage unit 31 configured to store a received packet as necessary, and a capture data generation unit 32 configured to generate capture data based on the packet stored by the packet storage unit 31. The analyzer 200 of the second embodiment includes a capture data reception unit 22 configured to receive capture data transmitted by the capture data generation unit 32 of the capturer 300 and also includes a capture data storage unit 23 configured to store the received capture data.

The capture data is formed by capturing at least part of the packets received by the burst traffic detection device 1. The capture data is used to specifically analyze traffic when burst traffic is detected. For example, the capture data may be formed by extracting from received packets packet data in a given period during the occurrence of burst traffic.

Data of received packets having been subjected to flow specification by the flow specification unit is stored in the packet storage unit 31 as necessary. When the burst detection count in the burst detection unit 15 is collected, the capture data generation unit 32 generates capture data by using the data of received packets stored in the packet storage unit 31.

The capture data generated by the capture data generation unit 32 is transmitted to the analyzer 200 and used to analyze burst traffic together with the data of the burst detection count transmitted by the detector 100.

Operational Flow of Burst Traffic Detection Method

Figure 8:
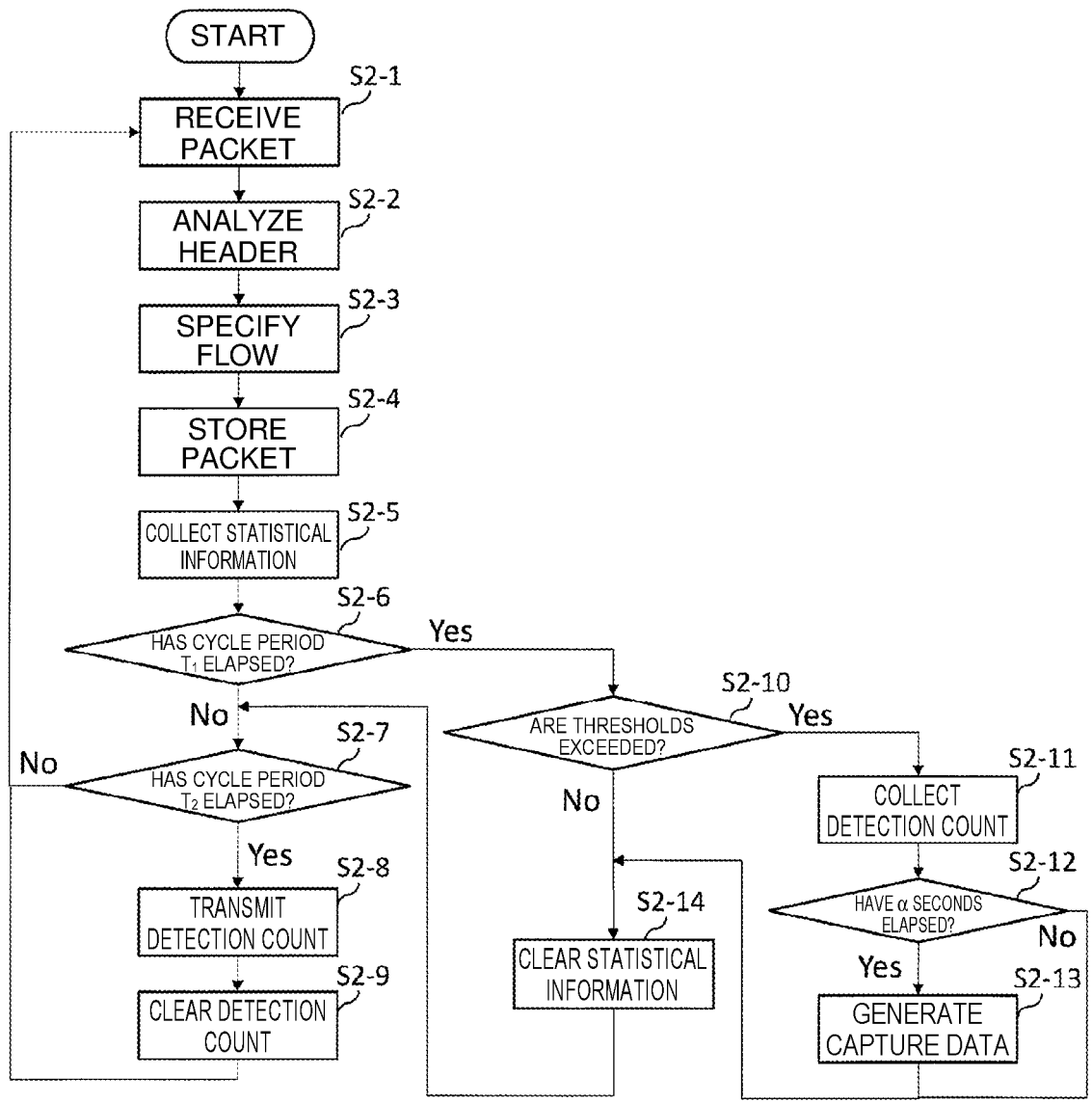
FIG. 8 is a flowchart illustrating an operational procedure of a burst traffic detection method according to the second embodiment of the present invention.

An operational procedure of a burst traffic detection method according to the second embodiment will be described with reference to FIG. 8. A flowchart in FIG. 8 is illustrated only to facilitate understanding of the control operation and thus intended not to limit the control procedure and implementation method.

The steps (S2-1 to S2-10) from receiving a packet to detecting the occurrence of burst traffic in the burst traffic detection method according to the second embodiment are identical to the steps in the first embodiment.

When in step S2-10 it is determined that the total number of packets and the total number of bytes exceed the preset thresholds, the burst detection count is collected (S2-11). In the example in FIG. 8, after the burst detection count is collected, it is determined whether a predetermined time of a seconds has elapsed since the detection of burst traffic (S2-12). When the predetermined time of a seconds has elapsed, capture data is generated in accordance with the data of received packets stored in the packet storage unit 31 (S2-13).

The example described above is generating capture data when the predetermined time elapses since the detection of burst traffic, but capture data may be set as appropriate in accordance with the traffic condition targeted for analysis and specifics of data analysis. The time when the packet storage unit 31 stores data of received packets used to generate capture data and the amount of the data can also be set as appropriate in accordance with specifics of data analysis and necessary memory resources.

After the capture data is generated, the statistical information is cleared to 0 (S2-14), in the same manner as the first embodiment. In the same manner as the first embodiment, the burst detection count may be configured to transmit in the predetermined cycle T2 (S2-7 to S2-9).

As described above, in the second embodiment, making combined use of the function of burst detection and the function of packet capturing enables two-stage analysis including approximate analysis according to the first embodiment and detailed analysis using capture data. This achieves more efficient analysis than analyzing all received data.

Extension of Embodiments

The present invention has been described above in accordance with the embodiments, but the present invention is not limited to the embodiments described above. Various modifications to the configurations and details of the present invention, which are readily understood by those skilled in the art, may be made without departing from the scope of the invention.

REFERENCE SIGNS LIST

1 Burst traffic detection device
10 Packet reception unit
11 Header analysis unit
12 Flow specification unit
13 Flow information storage unit
14 Statistical information storage unit
15 Burst detection unit
16 Parameter configuration unit
17 Detection count storage unit
18 Timer unit
19 Detection count transmission unit
100 Detector
200 Analyzer.

The invention claimed is:

1. A burst traffic detection device comprising:
   circuitry configured to perform one or more of implementing logical operations and executing instructions;
   a packet receiver configured to receive packets from a network;
   a flow specification device comprising at least a portion of the circuitry and configured to specify, in accordance with header information of the packets, flow rules;
   a flow information storage device configured to store flow information of the flow rules;
   a statistical information storage device configured to store statistical information, the statistical information including a total number of packets corresponding to each of the flow rules or a total number of bytes corresponding to each of the flow rules;
   a burst detection device comprising at least a portion of the circuitry and configured to detect an occurrence of burst traffic in accordance with the statistical information; and
   a detection count storage device configured to store a number of times of the occurrence of burst traffic, wherein:
      the burst detection device is configured to determine in a predetermined first cycle whether the total number of packets or the total number of bytes exceed one or more preset thresholds,
      the detection count storage device is configured to collect, as a burst detection count for each of the flow rules, a number of times the one or more preset thresholds is exceeded, wherein a quantity of detected bursts represented by the burst detection count is equal to a number of instances that the one or more preset thresholds is exceeded during the predetermined first cycle, and
      the statistical information storage device is configured to delete, after the burst detection count for each of the flow rules is collected, the statistical information of the flow rule.

2. The burst traffic detection device according to claim 1, wherein the burst detection device further comprises:
   a first counter configured to collect the total number of packets corresponding to each of the flow rules or the total number of bytes corresponding to each of the flow rules;

a comparator configured to determine in the predetermined first cycle whether the total number of packets or the total number of bytes exceed the one or more preset thresholds; and a second counter configured to collect, as the burst detection count for each of the flow rules, the number of times the one or more preset thresholds is exceeded.

3. The burst traffic detection device according to claim 1, further comprising:

an analyzer configured to analyze burst traffic; and a detection count transmitter configured to transmit to the analyzer in a predetermined second cycle the burst detection count for each of the flow rules collected by the detection count storage device, wherein the detection count storage device is configured to delete, after the burst detection count for each of the flow rules is transmitted, a respective burst detection count of a respective one of the flow rules.

4. The burst traffic detection device according to claim 3, further comprising:

a capturer comprising at least a portion of the circuitry and configured to store, after the burst detection count for each of the flow rules is collected, information about packets received for a predetermined period, wherein the capturer is configured to transmit the information about the packets to the analyzer.

5. A burst traffic detection method comprising:

receiving, by a burst traffic detection device, packets from a network;

specifying, in accordance with header information of the packets, flow rules;

storing statistical information including a total number of packets corresponding to each of the flow rules or a total number of bytes corresponding to each of the flow rules;

detecting an occurrence of burst traffic by determining in a predetermined first cycle whether the total number of packets corresponding to each of the flow rules or the total number of bytes corresponding to each of the flow rules exceed one or more preset thresholds;

collecting, as a burst detection count for each of the flow rules, a number of times the one or more preset thresholds is exceeded, wherein a quantity of detected bursts represented by the burst detection count is equal to a number of instances that the one or more preset thresholds is exceeded during the predetermined first cycle; and after the burst detection count for each of the flow rules is collected, deleting the statistical information of the flow rule.

6. The burst traffic detection method according to claim 5, wherein the detecting the occurrence of burst traffic comprises:

collecting the total number of packets corresponding to each of the flow rules or the total number of bytes corresponding to each of the flow rules;

determining in the predetermined first cycle whether the total number of packets or the total number of bytes exceed the one or more preset thresholds; and collecting, as the burst detection count for each of the flow rules, the number of times the one or more preset thresholds is exceeded.

7. The burst traffic detection method according to claim 5, comprising:

transmitting in a predetermined second cycle the burst detection count for each of the flow rules; and deleting, after the burst detection count for each of the flow rules is transmitted, a respective burst detection count corresponding to a respective one of the flow rules.

8. The burst traffic detection method according to claim 5, further comprising:

storing, after the burst detection count for each of the flow rules is collected, information about packets received for a predetermined period.

* * * * *